United States Patent
Yang (10) Patent No.: US 11,239,705 B2
(45) Date of Patent: Feb. 1, 2022

(54) METHOD FOR FOREIGN OBJECT DETECTION IN WIRELESS CHARGING, WIRELESS CHARGING DEVICE, AND STORAGE MEDIUM

(71) Applicant: GUANGDONG OPPO MOBILE TELECOMMUNICATIONS CORP., LTD., Guangdong (CN)

(72) Inventor: Jun Yang, Guangdong (CN)

(73) Assignee: GUANGDONG OPPO MOBILE TELECOMMUNICATIONS CORP., LTD., Guangdong (CN)

(*) Notice: Subject to any disclaimer, the term of this patent is extended or adjusted under 35 U.S.C. 154(b) by 49 days.

(21) Appl. No.: 16/944,824

(22) Filed: Jul. 31, 2020

(65) Prior Publication Data

US 2021/0044156 A1 Feb. 11, 2021

(30) Foreign Application Priority Data

Aug. 5, 2019 (CN) .......................... 201910716586.4

(51) Int. Cl.
*H02J 50/60* (2016.01)
*H02J 50/10* (2016.01)

(52) U.S. Cl.
CPC .............. *H02J 50/60* (2016.02); *H02J 50/10* (2016.02); *H02J 2310/22* (2020.01)

(58) Field of Classification Search
CPC ...................................................... H02J 50/60
(Continued)

(56) References Cited

U.S. PATENT DOCUMENTS

| 2013/0134792 A1* | 5/2013 | Bunsen | H02J 50/60 |
| | | | 307/104 |
| 2015/0263532 A1 | 9/2015 | Van Wageningen | |
| 2016/0064952 A1* | 3/2016 | Matsumoto | H02J 50/40 |
| | | | 307/104 |

FOREIGN PATENT DOCUMENTS

| CN | 103852631 | 6/2014 |
| CN | 105334539 | 2/2016 |

(Continued)

OTHER PUBLICATIONS

IPI, Office Action for IN Application No. 202014032857, dated Jul. 29, 2021.

(Continued)

*Primary Examiner* — Edward Tso
*Assistant Examiner* — Ahmed H Omar
(74) *Attorney, Agent, or Firm* — Hodgson Russ LLP (57) ABSTRACT

Methods and apparatuses for detecting a foreign object during wireless charging are described. The method can include obtaining a first parameter value and a second parameter value according to: a charging current when a transmitted power falls into a first charging power range, obtained; or a charging voltage when the transmitted power falls into a second charging power range. A reference received power can be obtained according to the first parameter value, the second parameter value, and the received power of the wireless charging receiver. The existence of a foreign object between the wireless charging transmitter and the wireless charging receiver can be determined according to a difference between the transmitted power and the reference received power. For the first charging power range, the transmitter can output a constant voltage, and for the second charging power range, the transmitter can output a constant current.

20 Claims, 4 Drawing Sheets

(58) Field of Classification Search
USPC .......................................................... 320/108
See application file for complete search history.

(56) References Cited

FOREIGN PATENT DOCUMENTS

| | | |
|---|---|---|
| CN | 109143383 | 1/2019 |
| CN | 110492625 | 11/2019 |
| EP | 2779359 | 9/2014 |
| EP | 3231056 | 10/2017 |

OTHER PUBLICATIONS

EPO, Extended European Search Report for EP Application No. 20188813.8, dated Nov. 17, 2020.
WIPO, ISR for PCT/CN2020/106728, dated Nov. 6, 2020.

\* cited by examiner

| OBTAIN A FIRST PARAMETER VALUE AND A SECOND PARAMETER VALUE ACCORDING TO A CHARGING CURRENT OUTPUTTED BY A WIRELESS CHARGING TRANSMITTER WHEN A TRANSMITTED POWER OF THE WIRELESS CHARGING TRANSMITTER FALLS INTO A FIRST CHARGING POWER RANGE, AND OBTAIN A REFERENCE RECEIVED POWER ACCORDING TO THE FIRST PARAMETER VALUE, THE SECOND PARAMETER VALUE, AND A RECEIVED POWER OF A WIRELESS CHARGING RECEIVER | S310 |

↓

| OBTAIN THE FIRST PARAMETER VALUE AND THE SECOND PARAMETER VALUE ACCORDING TO A CHARGING VOLTAGE OUTPUTTED BY THE WIRELESS CHARGING TRANSMITTER WHEN THE TRANSMITTED POWER OF THE WIRELESS CHARGING TRANSMITTER FALLS INTO A SECOND CHARGING POWER RANGE, AND OBTAIN THE REFERENCE RECEIVED POWER ACCORDING TO THE FIRST PARAMETER VALUE, THE SECOND PARAMETER VALUE, AND THE RECEIVED POWER OF THE WIRELESS CHARGING RECEIVER | S320 |

↓

| DETERMINE, ACCORDING TO A DIFFERENCE BETWEEN THE TRANSMITTED POWER AND THE REFERENCE RECEIVED POWER, EXISTENCE OF A FOREIGN OBJECT BETWEEN THE WIRELESS CHARGING TRANSMITTER AND THE WIRELESS CHARGING RECEIVER | S330 |

FIG. 3

| OBTAIN A FIRST TRANSMITTED POWER AND A FIRST THEORETICAL RECEIVED POWER CORRESPONDING TO A FIRST CHARGING CURRENT WHEN THE TRANSMITTED POWER OF THE WIRELESS CHARGING TRANSMITTER FALLS INTO THE FIRST CHARGING POWER RANGE, WHERE THE FIRST CHARGING CURRENT IS ANY CHARGING CURRENT, AND THE FIRST THEORETICAL RECEIVED POWER IS A RECEIVED POWER OF THE WIRELESS CHARGING RECEIVER CORRESPONDING TO THE FIRST TRANSMITTED POWER WHEN NO FOREIGN OBJECT EXISTS BETWEEN THE WIRELESS CHARGING TRANSMITTER AND THE WIRELESS CHARGING RECEIVER | S410 |

↓

| DETERMINE THE FIRST PARAMETER VALUE AND THE SECOND PARAMETER VALUE CORRESPONDING TO THE FIRST CHARGING CURRENT ACCORDING TO THE FIRST TRANSMITTED POWER AND THE FIRST THEORETICAL RECEIVED POWER | S420 |

FIG. 4

OBTAIN A FIRST TRANSMITTED POWER AND A FIRST THEORETICAL RECEIVED POWER CORRESPONDING TO A FIRST CHARGING VOLTAGE WHEN THE TRANSMITTED POWER OF THE WIRELESS CHARGING TRANSMITTER FALLS INTO THE SECOND CHARGING POWER RANGE, WHERE THE FIRST CHARGING VOLTAGE IS ANY CHARGING VOLTAGE, AND THE FIRST THEORETICAL RECEIVED POWER IS A RECEIVED POWER OF THE WIRELESS CHARGING RECEIVER CORRESPONDING TO THE FIRST TRANSMITTED POWER WHEN NO FOREIGN OBJECT EXISTS BETWEEN THE WIRELESS CHARGING TRANSMITTER AND THE WIRELESS CHARGING RECEIVER — S510

DETERMINE THE FIRST PARAMETER VALUE AND THE SECOND PARAMETER VALUE CORRESPONDING TO THE FIRST CHARGING VOLTAGE ACCORDING TO THE FIRST TRANSMITTED POWER AND THE FIRST THEORETICAL RECEIVED POWER — S520

METHOD FOR FOREIGN OBJECT DETECTION IN WIRELESS CHARGING, WIRELESS CHARGING DEVICE, AND STORAGE MEDIUM

CROSS REFERENCE TO RELATED APPLICATION

This application claims priority to Chinese Patent Application No. 201910716586.4, filed on Aug. 5, 2019, the entire disclosure of which is incorporated herein by reference.

TECHNICAL FIELD

This disclosure relates to the field of charging technology, and more particularly to a method for foreign object detection in wireless charging, a wireless charging device, and a storage medium.

BACKGROUND

With the development and progress in charging technology, wireless charging is increasingly becoming more common in various types of electronic devices. However, if there is a foreign metal object between a transmitter and a receiver during wireless charging, the foreign metal object will draw electrical energy. This can cause heating of the foreign metal object and power loss, thus causing safety issues and affecting user experience.

Currently, existence of a foreign metal object between a transmitter and receiver during wireless charging is determined by detecting power loss. When the power loss is greater than a preset threshold, it is determined that a foreign metal object(s) is located between the transmitter and the receiver. This method, however, suffers from low accuracy in recognizing a foreign metal object.

It should be noted that, the information disclosed above is only for better understanding of the background of the present disclosure, and therefore may include information that does not constitute prior art.

SUMMARY

The present disclosure aims to provide a method and apparatus for foreign object detection in wireless charging, an electronic device, and a storage medium, which is possible to solve the problem of low recognition accuracy in foreign object detection in the method for foreign object detection in wireless charging in the related art.

In a first embodiment, a method for foreign object detection in wireless charging is provided. The method is applicable to a wireless charging transmitter. The method includes the following. A first parameter value and a second parameter value can be obtained according to a charging current outputted by the wireless charging transmitter, when a transmitted power of the wireless charging transmitter falls into a first charging power range, and a reference received power is obtained according to the first parameter value, the second parameter value, and a received power of a wireless charging receiver. The first parameter value and the second parameter value can be obtained according to a charging voltage outputted by the wireless charging transmitter, when the transmitted power of the wireless charging transmitter falls into a second charging power range. The reference received power can obtained according to the first parameter value, the second parameter value, and the received power of the wireless charging receiver. The existence of a foreign object between the wireless charging transmitter and the wireless charging receiver can be determined according to a difference between the transmitted power and the reference received power. For the first charging power range, the wireless charging transmitter can output a constant voltage, and for the second charging power range, the wireless charging transmitter can output a constant current.

In a second embodiment, an apparatus for foreign object detection in wireless charging is provided. The apparatus is applicable to a wireless charging transmitter. The apparatus includes a first obtaining module, a second obtaining module, and a first determining module. The first obtaining module can be configured to obtain a first parameter value and a second parameter value according to a charging current outputted by the wireless charging transmitter, when a transmitted power of the wireless charging transmitter falls into a first charging power range, and obtain a reference received power according to the first parameter value, the second parameter value, and a received power of a wireless charging receiver. The second obtaining module can be configured to obtain the first parameter value and the second parameter value according to a charging voltage outputted by the wireless charging transmitter, when the transmitted power of the wireless charging transmitter falls into a second charging power range, and obtain the reference received power according to the first parameter value, the second parameter value, and the received power of the wireless charging receiver. The first determining module can be configured to determine, according to a difference between the transmitted power and the reference received power, the existence of a foreign object between the wireless charging transmitter and the wireless charging receiver. For the first charging power range, the wireless charging transmitter can output a constant voltage, and for the second charging power range, the wireless charging transmitter can output a constant current.

In a third embodiment, an electronic device is provided. The electronic device includes a processor and a memory. The memory is configured to store computer readable instructions which, when executed by the processor, are operable with the processor to perform the method described above.

In a fourth embodiment, a computer readable storage medium is provided. The computer readable storage medium is configured to store computer programs which, when executed by a processor, are operable with the processor to perform the method described above.

According to the method provided herein, in a constant-voltage charging stage, the first parameter value and the second parameter value can be obtained according to the charging current outputted by the wireless charging transmitter. The reference received power can be obtained according to the first parameter value, the second parameter value, and the received power of the wireless charging receiver. In a constant-current charging stage, the first parameter value and the second parameter value can be obtained according to the charging voltage outputted by the wireless charging transmitter. The reference received power can be obtained according to the first parameter value, the second parameter value, and the received power of the wireless charging receiver. The presence of a foreign object can be determined between the wireless charging transmitter and the wireless charging receiver according to the difference between the transmitted power and the reference received power. As a result, the present disclosure provides for detecting foreign objects during wireless charging across different power ranges. The present disclosure can improve the accuracy of detecting foreign objects during wireless charging.

It should be understood that, the above general description and the following detailed description are merely exemplary and explanatory, and should not constitute any limitation on the present disclosure.

BRIEF DESCRIPTION OF THE DRAWINGS

The above and other features and advantages of embodiments will become more apparent by describing exemplary embodiments in detail with reference to the accompanying drawings.

FIG. 3 is a schematic flowchart of a method for foreign object detection in wireless charging according to embodiments.

FIG. 4 is a schematic flowchart of a method for foreign object detection in wireless charging according to other embodiments.

DETAILED DESCRIPTION

Exemplary embodiments will now be described more comprehensively with reference to the accompanying drawings. However, the embodiments described herein can be implemented in various ways and should not be construed as limiting. Instead, these embodiments are provided so that this disclosure will be comprehensive and complete, and will convey fully the concept of exemplary embodiments to those skilled in the art. The same reference numerals in the drawings denote the same or similar parts, and their repeated description will be omitted.

In addition, the described features, structures, or characteristics may be combined in any suitable manner in one or more embodiments. In the following description, specific details are provided to give a full understanding of the embodiments. However, those skilled in the art will realize that the technical solutions of embodiments may be practiced without one or more of the specific details, or other methods, components, materials, devices, steps, etc. may be adopted. In other instances, well-known structures, methods, devices, embodiments, materials, or operations have not been shown or described in detail to avoid obscuring aspects of the present disclosure.

The block diagrams shown in the drawings are merely functional entities and do not necessarily correspond to physically separated entities. That is, these functional entities may be implemented in the form of software, or all or part of these functional entities may be implemented in one or more software-hardened modules, or implemented in different networks and/or processor devices and/or microcontroller devices.

Figure 1:
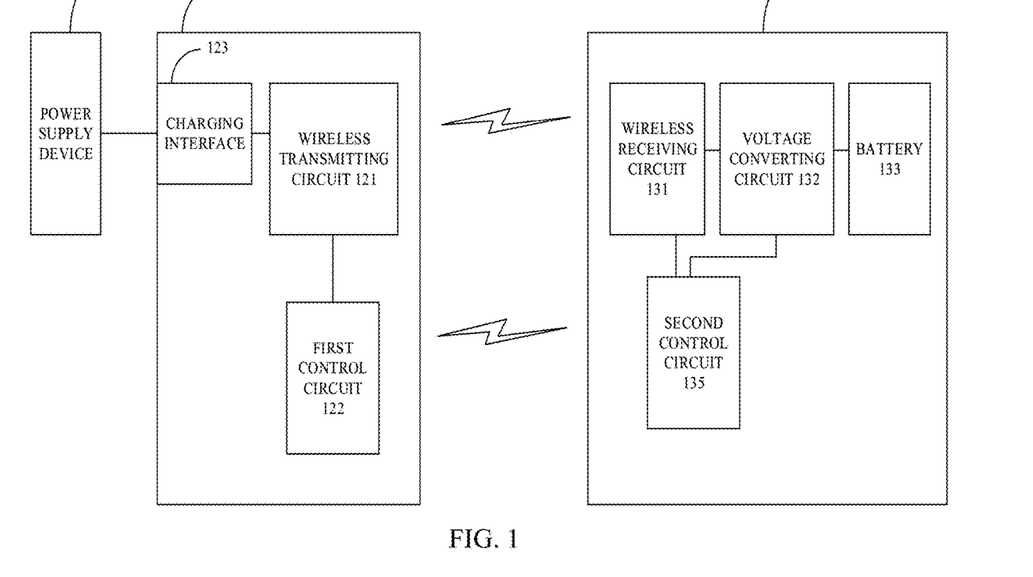
FIG. 1 is a schematic structural diagram of a wireless charging system according to embodiments.

FIG. 1 is a schematic structural diagram of a wireless charging system according to embodiments. As illustrated in FIG. 1, the wireless charging system includes a power supply device 11, a wireless charging apparatus 12, and a device to-be-charged 13. The power supply device 11 may be, for example, a power adaptor, a power bank, etc. The wireless charging apparatus 12 may be, for example, a wireless charging base. The device to-be-charged 13 may be, for example, a terminal.

After being coupled with the wireless charging apparatus 12, the power supply device 11 supplies an output current to the wireless charging apparatus 12. The wireless charging apparatus 12 includes a wireless transmitting circuit 121 and a first control circuit 122. The wireless transmitting circuit 121 is configured to convert electrical energy outputted by the power supply device 11 into an electromagnetic signal (or electromagnetic wave) for transmission, to perform wireless charging on the device to-be-charged 13. For instance, the wireless transmitting circuit 121 may include a wireless transmitting driving circuit and a transmitting coil (or transmitting antenna). The wireless transmitting driving circuit can convert a direct current (DC) outputted by the power supply device 11 into a high frequency alternating current (AC) and convert, via the transmitting coil or transmitting antenna, the high frequency AC into the electromagnetic signal (or electromagnetic wave) for transmission.

The device to-be-charged 13 can include a wireless receiving circuit 131, a voltage converting circuit 132, a battery 133, and a second control circuit 135. The wireless receiving circuit 131 is configured to receive an electromagnetic signal (or electromagnetic wave) transmitted by the wireless transmitting circuit 121 and convert the electromagnetic signal (or electromagnetic wave) into a DC outputted by the wireless receiving circuit 131. For example, the wireless receiving circuit 131 may include a receiving coil (or receiving antenna) and a shaping circuit (such as a rectifying circuit and/or a filtering circuit) coupled with the receiving coil (or receiving antenna). The wireless receiving circuit 131 can convert, via the receiving coil (or receiving antenna), the electromagnetic signal (or electromagnetic wave) transmitted by the wireless transmitting circuit 121 into an AC and covert the AC into a steady DC by rectifying and/or filtering the AC with the shaping circuit, so as to charge the battery 133.

Figure 2:
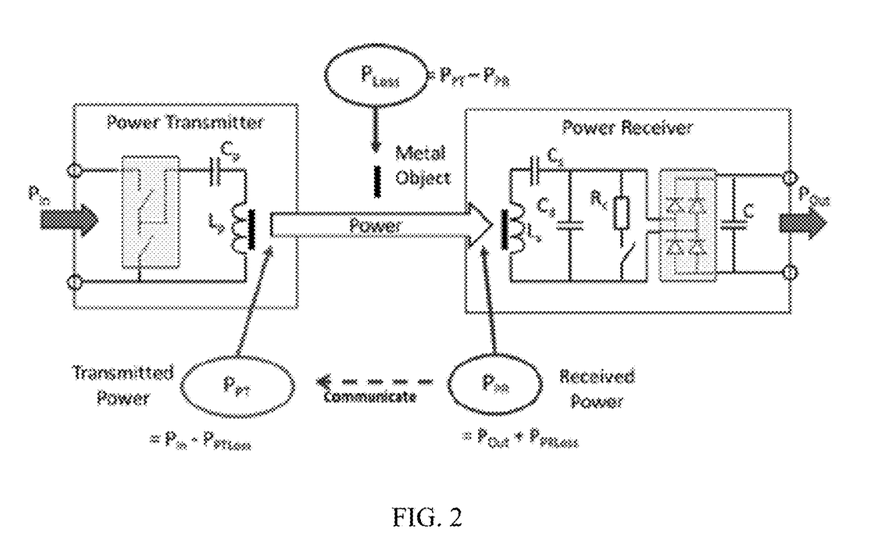
FIG. 2 is a schematic diagram illustrating wireless charging power transfer according to embodiments.

FIG. 2 is a schematic diagram illustrating power transfer of a wireless charging system according to embodiments. As illustrated in FIG. 2, an input power of a wireless charging transmitter 12 is $P_{in}$, a power loss in power delivery inside the wireless charging transmitter 12 is $P_{PTLoss}$, an output power (that is, transmitted power) of the wireless charging transmitter 12 is $P_{PT}=P_{in}-P_{PTLoss}$, a received power of a wireless charging receiver 13 is $P_{PR}$, a power loss inside the wireless charging receiver 13 is $P_{PRLoss}$, and an output power of the wireless charging receiver 13 is $P_{Out}=P_{PR}-P_{PRLoss}$. A power loss when a foreign object is located between the wireless charging transmitter 12 and the wireless charging receiver 13 is $P_{Loss}=P_{PT}-P_{PR}$.

The wireless charging transmitter described herein refers to the wireless charging apparatus, that is, the wireless charging base. A transmitted power of the wireless charging apparatus is $P_{PT}$ described above. A charging current refers to an output current of the wireless charging apparatus, and a charging voltage refers to an output voltage of the wireless charging apparatus. The wireless charging receiver described herein refers to the device to-be-charged, that is, the terminal. A received power of the device to-be-charged is $P_{PR}$ described above.

According to embodiments of the present disclosure, a method for foreign object detection during wireless charging is described. The method can be applicable to a wireless charging transmitter. As illustrated in FIG. 3, the method may include the following.

At step S310, a first parameter value and a second parameter value are obtained according to a charging current outputted by the wireless charging transmitter when a transmitted power (for example, $P_{PT}$) of the wireless charging transmitter falls into a first charging power range (for example, 0~10 W), and a reference received power is obtained according to the first parameter value, the second parameter value, and a received power ($P_{PR}$) of a wireless charging receiver. Information regarding the received power of the wireless charging receiver can be communicated to the wireless charging transmitter from the wireless charging receiver.

At step S320, the first parameter value and the second parameter value are obtained according to a charging voltage outputted by the wireless charging transmitter when the transmitted power of the wireless charging transmitter falls into a second charging power range (for example, 10~20 W), and the reference received power is obtained according to the first parameter value, the second parameter value, and the received power of the wireless charging receiver.

At step S330, the existence of a foreign object between the wireless charging transmitter and the wireless charging receiver can be determined according to a difference between the transmitted power and the reference received power.

For the first charging power range, the wireless charging transmitter operates in a constant voltage mode and outputs a constant voltage (for example, 10V), and for the second charging power range, the wireless charging transmitter operates in a constant current mode and outputs a constant current (such as 1 A).

According to the method provided herein, in a constant-voltage charging stage, the first parameter value and the second parameter value can be obtained according to the charging current outputted by the wireless charging transmitter. The reference received power can be obtained according to the first parameter value, the second parameter value, and the received power of the wireless charging receiver. In a constant-current charging stage, the first parameter value and the second parameter value can be obtained according to the charging voltage outputted by the wireless charging transmitter. The reference received power can be obtained according to the first parameter value, the second parameter value, and the received power of the wireless charging receiver. A determination whether a foreign object is located between the wireless charging transmitter and the wireless charging receiver can be made according to the transmitted power minus the reference received power. As a result, foreign objects can be detected during wireless charging across different power ranges, and the accuracy of detecting foreign objects during wireless charging can be improved.

An electronic device according to embodiments of the present disclosure may be a wireless charging base, for example, a wireless charging base of a terminal such as a mobile phone, a tablet PC, a wearable device, a smart television, an e-book, or a power bank.

As illustrated in FIG. 4, the method can further include the following.

At step S410, when the transmitted power of the wireless charging transmitter falls into the first charging power range, a first transmitted power and a first theoretical received power corresponding to a first charging current can be obtained, where the first charging current is any charging current, and the first theoretical received power is a received power of the wireless charging receiver corresponding to the first transmitted power when there is no foreign object between the wireless charging transmitter and the wireless charging receiver.

At step S420, the first parameter value and the second parameter value corresponding to the first charging current can be determined according to the first transmitted power and the first theoretical received power.

Figure 5:
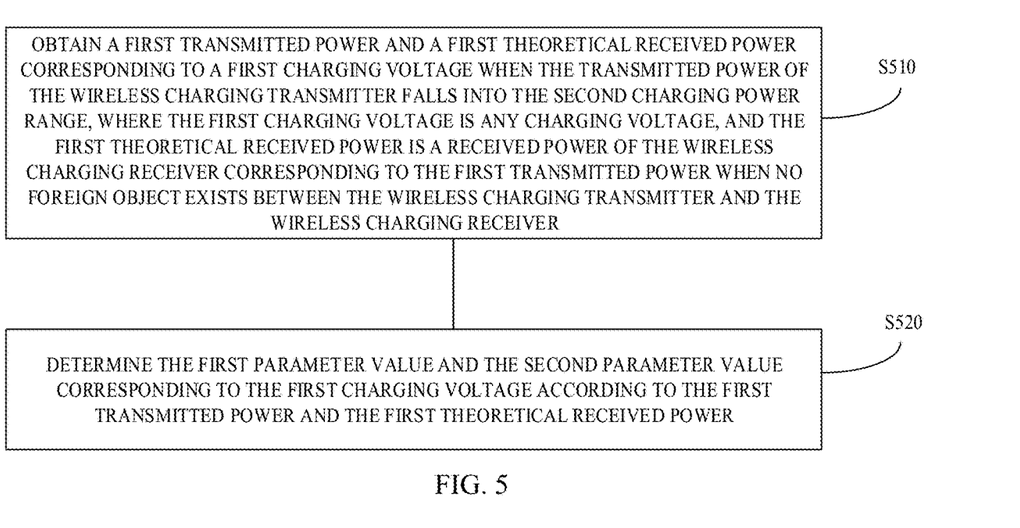
FIG. 5 is a schematic flowchart of a method for foreign object detection in wireless charging according to other embodiments.

As illustrated in FIG. 5, the method can further include the following.

At step S510, when the transmitted power of the wireless charging transmitter falls into the second charging power range, a first transmitted power and a first theoretical received power corresponding to a first charging voltage are obtained, where the first charging voltage can be any charging voltage, and the first theoretical received power is a received power of the wireless charging receiver when the transmitted power of the wireless charging transmitter is the first transmitted power when no foreign object is located between the wireless charging transmitter and the wireless charging receiver.

At step S520, the first parameter value and the second parameter value corresponding to the first charging voltage can be determined according to the first transmitted power and the first theoretical received power.

Operations at step S410, step S420, step S510, and step S520 can be performed before operations at step S310.

Hereinafter, operations of the method for foreign object detection during wireless charging provided herein will be described in detail.

At step S410, when the transmitted power of the wireless charging transmitter falls into the first charging power range, the first transmitted power and the first theoretical received power corresponding to the first charging current can be obtained, where the first charging current is any charging current, and the first theoretical received power is the received power of the wireless charging receiver corresponding to the first transmitted power when there is no foreign object between the wireless charging transmitter and the wireless charging receiver.

The first transmitted power and the first theoretical received power corresponding to the first charging current can be obtained as follows. The first transmitted power and the first theoretical received power corresponding to the first charging current which falls into a first current range can be obtained, where the charging current is set to have multiple current ranges, and the first current range is any one of the multiple current ranges.

The following may be performed before obtaining the first transmitted power and the first theoretical received power corresponding to the first charging current that falls into the first current range. Multiple current ranges can be set for the charging current when the transmitted power of the wireless charging transmitter falls into the first charging power range, and for each of the multiple current ranges, a difference between a maximum current and a minimum current which fall into the same current range is 100 mA (milliampere).

For each of the multiple current ranges set for the charging current, the difference between the maximum current and the minimum current that fall into the same current range may be equal or different. Each current range corresponds to one first parameter and one second parameter, and the first parameter and the second parameter corresponding to different current ranges may be the same or different.

As an example, a wireless charging power can correspond to two charging power ranges. That is, a first charging power range and a second charging power range. The first charging power range can be a constant-voltage charging power range, in which a charging power is 0~10 W (watt). The second charging power range can be a constant-current charging power range, in which a charging power is 10 W~20 W. In the first charging power range, the charging current can correspond to multiple current ranges. For each of the multiple current ranges, the difference between the maximum current and the minimum current that fall into the same current range may be 100 mA. For example, the charging current is 0~1000 mA, and accordingly, ten current ranges can be set for the charging current, where the ten current ranges are (0, 100], (100, 200], (200, 300], (300, 400], (400, 500], (500, 600], (600, 700], (700, 800], (800, 900], (900, 1000] respectively.

It can be understood that, when the transmitted power of the wireless charging transmitter falls into the first charging power range, the first transmitted power and the first theoretical received power corresponding to the first charging current can also be obtained without setting multiple current ranges for the charging current. That is, the first transmitted power and the first theoretical received power corresponding to each charging current in the whole charging current range can be obtained respectively. In other words, each charging current corresponds to a first parameter and a second parameter. However, by setting multiple current ranges for the charging current, amount of calculation and occupancy of resources can be reduced.

At step S420, the first parameter value and the second parameter value corresponding to the first charging current are determined according to the first transmitted power and the first theoretical received power.

The first parameter value and the second parameter value corresponding to the first charging current can be determined according to the first transmitted power and the first theoretical received power as follows. The first parameter value and the second parameter value corresponding to the first current range are determined by fitting according to the first transmitted power and the first theoretical received power corresponding to each of multiple first charging currents in the first current range, where the first parameter value and the second parameter value are determined such that a difference between the first transmitted power and a reference first theoretical received power is smaller than a preset threshold. The reference first theoretical received power is obtained according to the first parameter value, the second parameter value, and the first theoretical received power.

As an example, the reference received power can be calculated through the following formula:

$$P_{RS} = aP_R + b \qquad (1)$$

$P_{RS}$ refers to the reference received power, a refers to the first parameter, b refers to the second parameter, and $P_R$ refers to the received power.

During fitting, the first theoretical received power corresponding to each of the multiple first charging currents in the first current range is substituted into formula 1. a and b are adjusted such that the difference between the first transmitted power and the reference first theoretical received power corresponding to each first charging current is smaller than the preset threshold, and a and b thus obtained are used as the first parameter and the second parameter.

Fitting is performed for each current range, and as such, an associated relationship between the current range, the first parameter, and the second parameter is obtained. The associated relationship between the current range, the first parameter, and the second parameter can be stored in a storage device. When foreign object detection is performed during wireless charging, the first parameter and the second parameter can be determined according to the current range that the charging current falls into.

It can be understood that, the first parameter value and the second parameter value corresponding to the first charging current can also be determined according to the first transmitted power and the first theoretical received power in other manners without setting multiple current ranges for the charging current described above. For example, the first parameter value and the second parameter value corresponding to each charging current can be determined, and in this way, an associated relationship between the charging current, the first parameter value, and the second parameter value can be obtained.

At step S510, when the transmitted power of the wireless charging transmitter falls into the second charging power range, the first transmitted power and the first theoretical received power corresponding to the first charging voltage are obtained, where the first charging voltage is any charging voltage. The first theoretical received power is the received power of the wireless charging receiver when the transmitted power of the wireless charging transmitter is the first transmitted power when no foreign object is located between the wireless charging transmitter and the wireless charging receiver.

The first transmitted power and the first theoretical received power corresponding to the first charging voltage can be obtained as follows. Obtain the first transmitted power and the first theoretical received power corresponding to the first charging voltage which falls into a first voltage range, where the charging voltage is set to have multiple voltage ranges. The first voltage range can be any one of the multiple voltage ranges.

Before obtaining the first transmitted power and the first theoretical received power corresponding to the first charging voltage which falls into the first voltage range, the following can be conducted. Multiple voltage ranges are set for the charging voltage when the transmitted power of the wireless charging transmitter falls into the second charging power range, where for each of the multiple voltage ranges, a difference between a maximum voltage and a minimum voltage which fall into the same voltage range is 1V.

For each of the multiple voltage ranges set for the charging voltage, the difference between the maximum voltage and the minimum voltage which fall into the same voltage range may be equal or different. Each voltage range corresponds to one first parameter and one second parameter, and the first parameter and the second parameter corresponding to different voltage ranges may be the same or different.

As an example, the second charging power range is a constant-current charging power range, in which a charging power is 10 W~20 W. In the second charging power range, the charging voltage corresponds to multiple voltage ranges. For each of the multiple voltage ranges, the difference between the maximum voltage and the minimum voltage which fall into the same voltage range may be 1V (volt). For example, the charging voltage is 10V~20V, and accordingly, ten voltage ranges can be set for the charging voltage, where the ten voltage ranges are (10, 11], (11, 12], (12, 13], (13, 14], (14, 15], (15, 16], (16, 17], (17, 18], (18, 19], (19, 20] respectively.

At step S520, the first parameter value and the second parameter value corresponding to the first charging voltage are determined according to the first transmitted power and the first theoretical received power.

The first parameter value and the second parameter value corresponding to the first charging voltage can be determined according to the first transmitted power and the first theoretical received power as follows.

The first parameter value and the second parameter value corresponding to the first voltage range are determined by fitting according to the first transmitted power and the first theoretical received power corresponding to each of multiple first charging voltages in the first voltage range, where the first parameter value and the second parameter value are determined such that a difference between the first transmitted power and a reference first theoretical received power is smaller than a preset threshold. The reference first theoretical received power can be obtained according to the first parameter value, the second parameter value, and the first theoretical received power.

As an example, the reference received power can be calculated through the following formula:

$$P_{RS} = aP_R + b \qquad (1)$$

$P_{RS}$ refers to the reference received power, a refers to the first parameter, b refers to the second parameter, and $P_R$ refers to the received power.

During fitting, the first theoretical received power corresponding to each of the multiple first charging voltages in the first voltage range is substituted into formula 1. a and b are adjusted such that the difference between the first transmitted power and the reference first theoretical received power corresponding to each first charging voltage is smaller than the preset threshold, and a and b thus obtained are used as the first parameter and the second parameter.

Fitting is performed for each voltage range, and as such, an associated relationship between the voltage range, the first parameter, and the second parameter is obtained. The associated relationship between the voltage range, the first parameter, and the second parameter can be stored in a storage device. When foreign object detection is performed during wireless charging, the first parameter and the second parameter can be determined according to the voltage range which the charging voltage falls into.

It can be understood that, the first parameter value and the second parameter value corresponding to the first charging voltage can also be determined according to the first transmitted power and the first theoretical received power in other manners without setting multiple voltage ranges for the charging voltage described above. For example, the first parameter value and the second parameter value corresponding to each charging voltage can be determined, and in this way, an associated relationship between the charging voltage, the first parameter value, and the second parameter value is obtained.

At step S310, the first parameter value and the second parameter value are obtained according to the charging current outputted by the wireless charging transmitter when the transmitted power of the wireless charging transmitter falls into the first charging power range. The reference received power can be obtained according to the first parameter value, the second parameter value, and the received power of the wireless charging receiver.

The charging current outputted by the wireless charging transmitter can be detected, and according to a wireless charging current value detected, the first parameter value and the second parameter value corresponding to a present charging current can be acquired from the storage device. The wireless charging transmitter can be provided with a current sensor to detect the charging current outputted by the wireless charging transmitter. When an associated relationship between the charging current, the first parameter value, and the second parameter value stored in the storage device is the associated relationship between the current range, the first parameter value, and the second parameter value, the current range which the charging current falls into can be determined first, and then the first parameter value and the second parameter value corresponding to the current range can be acquired.

The received power of the wireless charging receiver can be detected at the wireless charging receiver. For example, the wireless charging receiver can be provided with a current sensor and a voltage sensor to detect a reception current and a reception voltage respectively, and accordingly the received power can be determined according to the reception current and the reception voltage. The wireless charging receiver sends the received power back to a transmitting device (that is, the wireless charging transmitter), for example, the wireless charging receiver sends the received power via mutual inductance coils or a wireless transceiver such as Bluetooth, infrared rays, etc.

After the first parameter value, the second parameter value, and the received power are obtained, the reference received power can be determined through Formula 1, where the reference received power is a corrected value of the received power.

The charging voltage is constant in the constant-voltage charging stage. The transmitted power of the wireless charging transmitter can be determined according to a real charging voltage and charging current. In practice, in order to improve detection accuracy, the charging voltage can be obtained through detection, but this disclosure is not limited in this regard.

At step S320, the first parameter value and the second parameter value are obtained according to the charging voltage outputted by the wireless charging transmitter when the transmitted power of the wireless charging transmitter falls into the second charging power range. The reference received power can be obtained according to the first parameter value, the second parameter value, and the received power of the wireless charging receiver.

The charging voltage outputted by the wireless charging transmitter can be detected, and according to a wireless charging voltage value detected, the first parameter value and the second parameter value corresponding to a present charging voltage can be acquired from the storage device. The wireless charging transmitter can be provided with a voltage sensor used to detect the charging voltage outputted by the wireless charging transmitter. When an associated relationship between the charging voltage, the first parameter value, and the second parameter value stored in the storage device is the associated relationship between the voltage range, the first parameter value, and the second parameter value, the voltage range which the charging voltage falls into can be determined first, and then the first parameter value and the second parameter value corresponding to the voltage range can be acquired.

The received power of the wireless charging receiver can be detected at the wireless charging receiver. For example, the wireless charging receiver can be provided with a current sensor and a voltage sensor to detect a reception current and a reception voltage respectively, and accordingly the received power can be determined according to the reception current and the reception voltage. The wireless charging receiver sends the received power back to a transmitting device (that is, the wireless charging transmitter), for example, the wireless charging receiver sends the received power via mutual inductance coils or a wireless transceiver such as Bluetooth, infrared rays, etc.

After the first parameter value, the second parameter value, and the received power are obtained, the reference received power can be determined through Formula 1, where the reference received power is a corrected value of the received power.

The charging current is constant in the constant-current charging stage. The transmitted power of the wireless charging transmitter can be determined according to a real charging voltage and charging current. In practice, in order to improve detection accuracy, the charging current can be obtained through detection, but this disclosure is not limited in this regard.

At step S330, the existence of a foreign object between the wireless charging transmitter and the wireless charging receiver can be determined, according to the difference between the transmitted power and the reference received power.

Determining whether a foreign object is located between the wireless charging transmitter and the wireless charging receiver can be determined according to the difference between the transmitted power and the reference received power as follows. The difference between the transmitted power and the reference received power may be determined according to the transmitted power and the reference received power. It can be determined that a foreign object is located between the wireless charging transmitter and the wireless charging receiver when the difference between the transmitted power and the reference received power is greater than a preset threshold.

The difference between the transmitted power and the reference received power is obtained by subtracting the reference received power from the transmitted power, where the transmitted power and the reference received power are obtained through operations at step S310 and step S320. When the transmitted power minus the reference received power is greater than the preset threshold, it can be determined that a foreign object is located between the wireless charging transmitter and the wireless charging receiver. When the transmitted power minus the reference received power is less than or equal to the preset threshold, it can be determined that no foreign object is located between the wireless charging transmitter and the wireless charging receiver.

The preset threshold can be stored in a storage device of a terminal and can be determined according to practical experience and in a manner of setting charging current ranges and charging voltage ranges. For example, in the constant-voltage charging stage, a difference between a maximum charging current and a minimum charging current which fall into the same current range is 100 mA, and in the constant-current charging stage, a difference between a maximum charging voltage and a minimum charging voltage which fall into the same voltage range is 1V. In this case, the preset threshold may be 350 mW (milliwatt). When the transmitted power minus the reference received power is greater than 350 mW, it can be determined that a foreign object is located between the wireless charging transmitter and the wireless charging receiver. When the transmitted power minus the reference received power is less than or equal to 350 mW, it can be determined that there is no foreign object between the wireless charging transmitter and the wireless charging receiver.

According to the method provided herein, in the constant-voltage charging stage, the first parameter value and the second parameter value are obtained according to the charging current outputted by the wireless charging transmitter. The reference received power can be obtained according to the first parameter value, the second parameter value, and the received power of the wireless charging receiver. In the constant-current charging stage, the first parameter value and the second parameter value are obtained according to the charging voltage outputted by the wireless charging transmitter. The reference received power can be obtained according to the first parameter value, the second parameter value, and the received power of the wireless charging receiver. Then it can be determined, according to the transmitted power minus the reference received power, whether there is any foreign object between the wireless charging transmitter and the wireless charging receiver, which is possible to achieve foreign object detection during wireless charging at different power ranges and improve accuracy in foreign object detection during wireless charging.

It should be noted that, although the steps of the method provided herein are described in a specific order in the accompanying drawings, this does not require or imply that these steps must be performed in the specific order, or all steps illustrated must be performed to achieve desired results. Additionally or alternatively, certain steps may be omitted, multiple steps may be combined into one step for execution, and/or one step may be split into multiple steps for execution, and so on.

Figure 6:
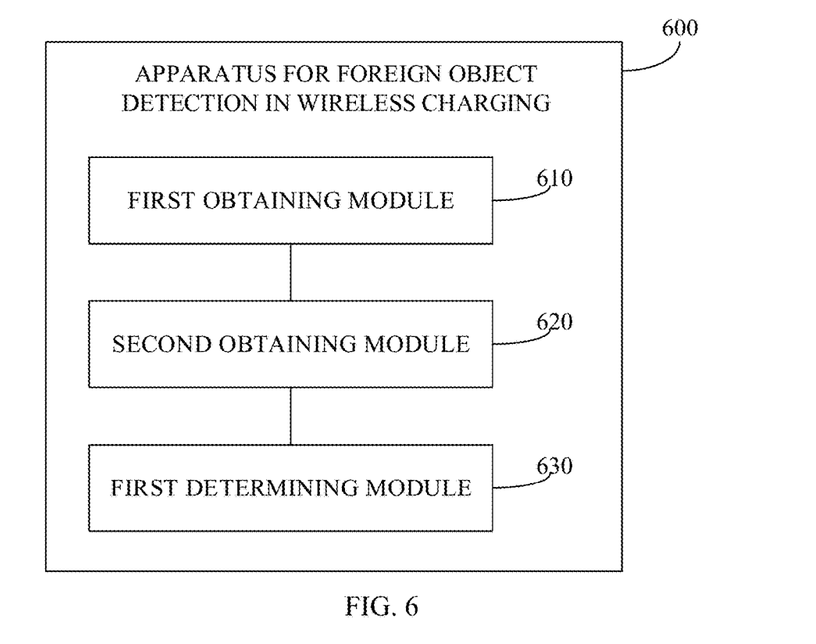
FIG. 6 is a schematic block diagram of an apparatus for foreign object detection in wireless charging according to embodiments.

Embodiments further provide an apparatus for foreign object detection during wireless charging. The apparatus can be applicable to a wireless charging system. As illustrated in FIG. 6, the apparatus can include a first obtaining module 610, a second obtaining module 620, and a first determining module 630. The first obtaining module 610 is configured to obtain a first parameter value and a second parameter value according to a charging current outputted by a wireless charging transmitter when a transmitted power of the wireless charging transmitter falls into a first charging power range, and obtain a reference received power according to the first parameter value, the second parameter value, and a received power of a wireless charging receiver. The second obtaining module 620 can be configured to obtain the first parameter value and the second parameter value according to a charging voltage outputted by the wireless charging transmitter when the transmitted power of the wireless charging transmitter falls into a second charging power range, and obtain the reference received power according to the first parameter value, the second parameter value, and the received power of the wireless charging receiver. The first determining module 630 can be configured to determine, according to a difference between the transmitted power and the reference received power, the existence of a foreign object between the wireless charging transmitter and the wireless charging receiver. For the first charging power range, the wireless charging transmitter outputs a constant voltage, and for the second charging power range, the wireless charging transmitter outputs a constant current.

In the apparatus provided herein, in a constant-voltage charging stage, the first obtaining module obtains the first parameter value and the second parameter value according to the charging current outputted by the wireless charging transmitter and obtains the reference received power according to the first parameter value, the second parameter value, and the received power of the wireless charging receiver. In a constant-current charging stage, the second obtaining module obtains the first parameter value and the second parameter value according to the charging voltage outputted by the wireless charging transmitter and obtains the reference received power according to the first parameter value, the second parameter value, and the received power of the wireless charging receiver. Then the determining module determines, according to the difference between the transmitted power and the reference received power, whether there is any foreign object between the wireless charging transmitter and the wireless charging receiver. With aid of the apparatus provided herein, it is possible to achieve foreign object detection during wireless charging at different power ranges and improve accuracy in foreign object detection during wireless charging.

In an example, the apparatus further includes a third obtaining module and a second determining module. The third obtaining module is configured to obtain a first transmitted power and a first theoretical received power corresponding to a first charging current when the transmitted power of the wireless charging transmitter falls into the first charging power range, where the first charging current is any charging current, and the first theoretical received power is a received power of the wireless charging receiver corresponding to the first transmitted power when no foreign object is located between the wireless charging transmitter and the wireless charging receiver. The second determining module is configured to determine the first parameter value and the second parameter value corresponding to the first charging current according to the first transmitted power and the first theoretical received power.

In an example, the third obtaining module includes a first obtaining sub-module. The first obtaining sub-module is configured to obtain the first transmitted power and the first theoretical received power corresponding to the first charging current which falls into a first current range, where the charging current is set to have multiple current ranges, and the first current range is any one of the multiple current ranges.

In an example, the second determining module includes a first determining sub-module. The first determining sub-module is configured to determine the first parameter value and the second parameter value corresponding to the first current range by fitting according to the first transmitted power and the first theoretical received power corresponding to each of multiple first charging currents in the first current range, where the first parameter value and the second parameter value are determined such that a difference between the first transmitted power and a reference first theoretical received power is smaller than a preset threshold. The reference first theoretical received power is obtained according to the first parameter value, the second parameter value, and the first theoretical received power.

In an example, the apparatus further includes a first setting module. The first setting module is configured to set multiple current ranges for the charging current when the transmitted power of the wireless charging transmitter falls into the first charging power range, where for each of the multiple current ranges, a difference between a maximum current and a minimum current which fall into the same current range is 100 mA.

In an example, the apparatus further includes a fourth obtaining module and a third determining module. The fourth obtaining module is configured to obtain a first transmitted power and a first theoretical received power corresponding to a first charging voltage when the transmitted power of the wireless charging transmitter falls into the second charging power range, where the first charging voltage is any charging voltage, and the first theoretical received power is a received power of the wireless charging receiver corresponding to the first transmitted power when no foreign object is located between the wireless charging transmitter and the wireless charging receiver. The third determining module is configured to determine the first parameter value and the second parameter value corresponding to the first charging voltage according to the first transmitted power and the first theoretical received power.

In an example, the fourth obtaining module includes a second obtaining sub-module. The second obtaining sub-module is configured to obtain the first transmitted power and the first theoretical received power corresponding to the first charging voltage which falls into a first voltage range, where the charging voltage is set to have multiple voltage ranges, and the first voltage range is any one of the multiple voltage ranges.

In an example, the third determining module includes a second determining sub-module. The second determining sub-module is configured to determine the first parameter value and the second parameter value corresponding to the first voltage range by fitting according to the first transmitted power and the first theoretical received power corresponding to each of multiple first charging voltages in the first voltage range, where the first parameter value and the second parameter value are determined such that a difference between the first transmitted power and a reference first theoretical received power is smaller than a preset threshold. The reference first theoretical received power is obtained according to the first parameter value, the second parameter value, and the first theoretical received power.

In an example, the apparatus further includes a second setting module. The second setting module can be configured to set multiple voltage ranges for the charging voltage when the transmitted power of the wireless charging transmitter falls into the second charging power range, where for each of the multiple voltage ranges, a difference between a maximum voltage and a minimum voltage which fall into the same voltage range is 1V.

In an example, the first determining module includes a third determining sub-module and a fourth determining sub-module. The third determining sub-module is configured to determine the difference between the transmitted power and the reference received power according to the transmitted power and the reference received power. The fourth determining sub-module can be configured determine that a foreign object is located between the wireless charging transmitter and the wireless charging receiver when the difference between the transmitted power and the reference received power is greater than a preset threshold.

Details on various modules of the apparatus for foreign object detection during wireless charging have been described in the corresponding method embodiments and thus will not be repeated herein.

It should be noted that, although several modules or units of the apparatus for foreign object detection during wireless charging have been mentioned in the detailed description above, such division is not mandatory. In practice, according to embodiments, the features and functions of two or more modules or units described above may be embodied in one module or unit. Conversely, the features and functions of one module or unit described above can be further divided into multiple modules or units to be embodied.

Embodiments of the present disclosure further provide an electronic device capable of performing the above method.

Those skilled in the art can understand that various aspects in embodiments can be implemented as a system, a method, or a program product and therefore can be embodied in the following forms: hardware-only embodiments, software-only embodiments (including firmware, microcode, etc.), or a combination of hardware and software (which can be collectively referred to as "circuit", "module", or "system").

An electronic device 700 according to embodiments will be described with reference to FIG. 7. The electronic device 700 illustrated in FIG. 7 is merely an example and should not be construed as limitation on the functions and scope of the disclosure.

Figure 7:
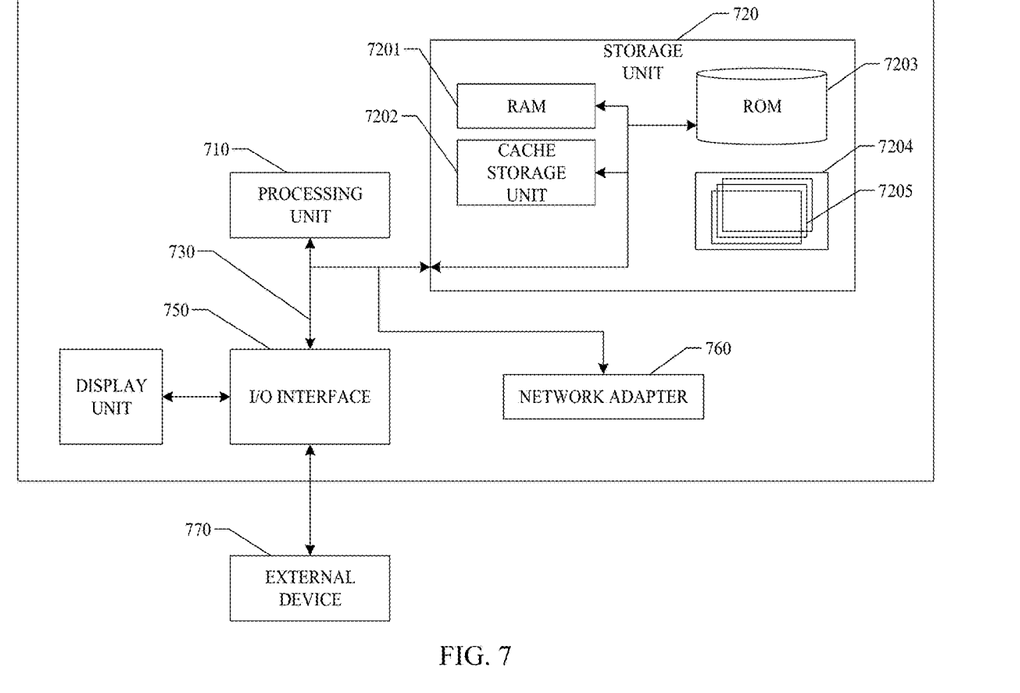
FIG. 7 is a schematic diagram of a terminal according to embodiments.

As illustrated in FIG. 7, the electronic device 700 is embodied as a general-purpose computing device. As an example, the electronic device 700 may be a wireless charging base. The components of the electronic device 700 may include but are not limited to at least one processing unit 710, at least one storage unit 720, a bus 730 coupling various system components (including the storage unit 720 and the processing unit 710), and a display unit 740. The processing unit 710 can be a processor. The storage unit 720 can be a memory, such as a non-transitory computer readable storage medium.

The storage unit stores program code, and the program code can be executed by the processing unit 710, such that the processing unit 710 executes steps of various exemplary embodiments described in the "exemplary method" section of the specification.

The storage unit 720 may include a readable medium in the form of a volatile storage unit, such as a random access memory (RAM) 7201 and/or a cache storage unit 7202, and may further include a read-only memory (ROM) 7203.

The storage unit 720 may further include a program/utility tool 7204 having a set of (at least one) program modules 7205. Such program modules 7205 include, but are not limited to, an operating system, one or more application programs, other program modules, and program data. Each or some combination of these examples may include an embodiment of a network environment.

The bus 730 may be one or more of several types of bus structures, including a storage unit bus or a storage unit controller, a peripheral bus, a graphics acceleration port, a processing unit, or a local area bus using any of a variety of bus structures.

The electronic device 700 may also communicate with one or more external devices 770 (such as a keyboard, pointing device, Bluetooth device, etc.), and may also communicate with one or more devices that enable a user to interact with the electronic device 700, and/or with any device (e.g., router, modem, etc.) that enables the electronic device 700 to communicate with one or more other computing devices. Such communication can be performed through an input/output (I/O) interface 750. In addition, the electronic device 700 can also communicate with one or more networks (such as a local area network (LAN), a wide area network (WAN), and/or a public network (such as the Internet)) through a network adapter 760. As illustrated in FIG. 7, the network adapter 760 communicates with other modules of the electronic device 700 through the bus 730. It should be understood that, although not illustrated, other hardware and/or software modules may be used in conjunction with the electronic device 700, including but not limited to: microcode, device drivers, redundant processing units, external disk drive arrays, RAID systems, tape drives, and data backup storage systems.

Through the description of the foregoing embodiments, those skilled in the art can easily understand that the exemplary embodiments described herein can be implemented by software, or by software in combination with necessary hardware. Therefore, the technical solution according to embodiments may be embodied in the form of a software product, which may be stored in a non-volatile storage medium (which may be a compact disc read-only memory (CD-ROM), a universal serial bus (USB) flash disk, a mobile hard disk, etc.) or on a network including several instructions to cause a computing device (which may be a personal computer, a server, a terminal, or a network device, etc.) to execute the method described in the foregoing embodiments.

A computer readable storage medium is further provided in embodiments. The computer readable storage medium is configured to store a program product capable of implementing the above-mentioned method. In some possible examples, various aspects of embodiments may also be implemented in the form of a program product, which includes program code. When the program product is run on a terminal, the program code is used to cause the terminal to perform the steps of various exemplary embodiments described in the "exemplary method" section of the specification.

Figure 8:
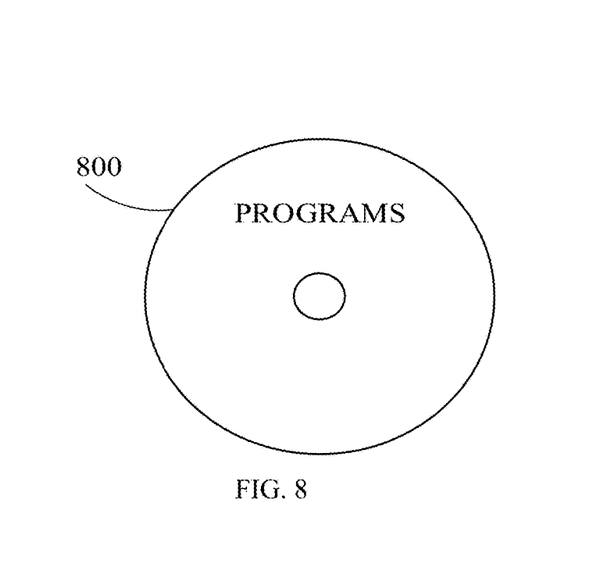
FIG. 8 is a schematic diagram of a computer readable storage medium according to embodiments.

As illustrated in FIG. 8, a program product 800 for implementing the method according to embodiments is described. The program product 800 may adopt a portable CD-ROM and include program code. The program product 800 may run on a terminal such as a personal computer. However, the program product according to embodiments is not limited thereto. In this document, the readable storage medium may be any tangible medium containing or storing a program, and the program may be used by or in combination with an instruction execution system, apparatus, or device.

The program product may employ any combination of one or more readable media. The readable medium may be a readable signal medium or a readable storage medium. The readable storage medium may be, for example, but is not limited to, an electronic, magnetic, optical, electromagnetic, infrared, or semiconductor system, apparatus, or device, or any combination thereof. More specific examples (non-exhaustive list) of readable storage media include: electrical connections with one or more wires, portable disks, hard disks, RAM, ROM, erasable programmable read-only memory (EPROM or flash memory), optical fiber, CD-ROM, optical storage device, magnetic storage device, or any suitable combination thereof.

The computer readable signal medium may include a data signal in baseband or propagated as part of a carrier wave, which carries readable program code. Such a propagated data signal may take many forms, including but not limited to electromagnetic signals, optical signals, or any suitable combination thereof. The readable signal medium may also be any readable medium other than a readable storage medium, and the readable medium may send, propagate, or transmit a program for use by or in combination with an instruction execution system, apparatus, or device.

The program code contained on the readable medium may be transmitted using any appropriate medium, including but not limited to wireless, wired, optical fiber cable, RF, etc., or any suitable combination of the foregoing.

The program code for performing the operations of the present disclosure can be written in any combination of one or more programming languages, which includes object-oriented programming languages—such as Java, C++, etc., and also includes conventional procedural programming language—such as "C" or a similar programming language. The program code may be executed entirely on a user computing device, partly on a user device, as an independent software package, partly on the user computing device and partly on a remote computing device, or entirely on the remote computing device or on a server. In the case of the remote computing device, the remote computing device may be connected to the user computing device through any kind of network, including a LAN or a WAN, or may be connected to an external computing device (e.g., connected via the Internet by using an Internet service).

In addition, the above-mentioned drawings are merely a schematic description of processes included in the method according to exemplary embodiments and do not constitute any limitation. It is easy to understand that the processes illustrated in the above drawings do not indicate or limit the chronological order of these processes. In addition, it is also easy to understand that these processes may be performed, for example, synchronously or asynchronously in multiple modules.

Those skilled in the art will readily contemplate other embodiments after considering the specification and practicing the disclosure. This application is intended to cover any variations, uses, or adaptations of this disclosure that conform to the general principles of this disclosure and include the common general knowledge or conventional technical means in the technical field not disclosed by this disclosure. The specification and embodiments (or examples) are considered to be exemplary only, with a true scope and spirit of the disclosure being indicated by the appended claims.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method for foreign object detection during wireless charging, comprising:
    obtaining a first parameter value and a second parameter value according to:
        a charging current outputted by a wireless charging transmitter, when a transmitted power of the wireless charging transmitter falls into a first charging power range; or
        a charging voltage outputted by the wireless charging transmitter, when the transmitted power of the wireless charging transmitter falls into a second charging power range;
    obtaining the reference received power according to the first parameter value, the second parameter value, and the received power of the wireless charging receiver; and
    determining, according to a difference between the transmitted power and the reference received power, that a foreign object is located between the wireless charging transmitter and the wireless charging receiver;
    wherein in the first charging power range, the wireless charging transmitter outputs a constant voltage, and in the second charging power range, the wireless charging transmitter outputs a constant current.

2. The method of claim 1, further comprising:
    obtaining a first transmitted power and a first theoretical received power corresponding to one of a first charging current and a first charging voltage, wherein the first charging current is any charging current and the first charging voltage is any charging voltage, and the first theoretical received power is a received power of the wireless charging receiver corresponding to the first transmitted power when no foreign object is located between the wireless charging transmitter and the wireless charging receiver.

3. The method of claim 2, further comprising:
    obtaining the first transmitted power and the first theoretical received power corresponding to the first charging current, when the transmitted power of the wireless charging transmitter falls into the first charging power range; and
    determining the first parameter value and the second parameter value corresponding to the first charging current according to the first transmitted power and the first theoretical received power.

4. The method of claim 3, wherein obtaining the first transmitted power and the first theoretical received power corresponding to the first charging current comprises:
    obtaining the first transmitted power and the first theoretical received power corresponding to the first charging current which falls into a first current range, wherein the charging current is set to have a plurality of current ranges, and the first current range is any one of the plurality of current ranges.

5. The method of claim 4, wherein determining the first parameter value and the second parameter value corresponding to the first charging current according to the first transmitted power and the first theoretical received power comprises:
    determining the first parameter value and the second parameter value corresponding to the first current range by fitting according to the first transmitted power and the first theoretical received power corresponding to each of a plurality of first charging currents in the first current range;
    wherein the first parameter value and the second parameter value are determined such that a difference between the first transmitted power and a reference first theoretical received power is smaller than a preset threshold, and the reference first theoretical received power is obtained according to the first parameter value, the second parameter value, and the first theoretical received power.

6. The method of claim 4, further comprising:
    setting a plurality of current ranges for the charging current when the transmitted power of the wireless charging transmitter falls into the first charging power range, wherein for each of the plurality of current ranges, a difference between a maximum current and a minimum current which fall into the same current range is 100 mA.

7. The method of claim 2, further comprising:
    obtaining a first transmitted power and a first theoretical received power corresponding to a first charging voltage, when the transmitted power of the wireless charging transmitter falls into the second charging power range; and
    determining the first parameter value and the second parameter value corresponding to the first charging voltage according to the first transmitted power and the first theoretical received power.

8. The method of claim 7, wherein obtaining the first transmitted power and the first theoretical received power corresponding to the first charging voltage comprises:
    obtaining the first transmitted power and the first theoretical received power corresponding to the first charging voltage which falls into a first voltage range, wherein the charging voltage is set to have a plurality of voltage ranges, and the first voltage range is any one of the plurality of voltage ranges.

9. The method of claim 8, wherein determining the first parameter value and the second parameter value corresponding to the first charging voltage according to the first transmitted power and the first theoretical received power comprises:
   determining the first parameter value and the second parameter value corresponding to the first voltage range by fitting according to the first transmitted power and the first theoretical received power corresponding to each of a plurality of first charging voltages in the first voltage range;
   wherein the first parameter value and the second parameter value are determined such that a difference between the first transmitted power and a reference first theoretical received power is smaller than a preset threshold, and the reference first theoretical received power is obtained according to the first parameter value, the second parameter value, and the first theoretical received power.

10. The method of claim 8, further comprising:
    setting a plurality of voltage ranges for the charging voltage when the transmitted power of the wireless charging transmitter falls into the second charging power range, wherein for each of the plurality of voltage ranges, a difference between a maximum voltage and a minimum voltage which fall into the same voltage range is 1V.

11. The method of claim 1, wherein determining that the foreign object is located between the wireless charging transmitter and the wireless charging receiver comprises:
    determining the difference between the transmitted power and the reference received power according to the transmitted power and the reference received power; and
    determining that the foreign object is located between the wireless charging transmitter and the wireless charging receiver when the difference between the transmitted power and the reference received power is greater than a preset threshold.

12. A wireless charging device comprising:
    a processor; and
    a memory configured to store computer readable instructions which, when executed by the processor, are operable with the processor to:
      obtain a first parameter value and a second parameter value according to:
        a charging current outputted by the wireless charging transmitter, when a transmitted power of the wireless charging transmitter falls into a first charging power range; or
        a charging voltage outputted by the wireless charging transmitter, when the transmitted power of the wireless charging transmitter falls into a second charging power range;
      obtain a reference received power according to the first parameter value, the second parameter value, and the received power of the wireless charging receiver; and
      determine, according to a difference between the transmitted power and the reference received power, that a foreign object is located between the wireless charging transmitter and the wireless charging receiver;
    wherein in the first charging power range, the wireless charging transmitter outputs a constant voltage, and in the second charging power range, the wireless charging transmitter outputs a constant current.

13. The wireless charging device of claim 12, wherein when executed by the processor, the computer readable instructions are operable with the processor to:
    obtain a first transmitted power and a first theoretical received power corresponding to one of a first charging current and a first charging voltage, wherein the first charging current is any charging current and the first charging voltage is any charging voltage, and the first theoretical received power is a received power of the wireless charging receiver corresponding to the first transmitted power when no foreign object is located between the wireless charging transmitter and the wireless charging receiver.

14. The wireless charging device of claim 13, wherein when executed by the processor, the computer readable instructions are operable with the processor to:
    obtain the first transmitted power and the first theoretical received power corresponding to the first charging current, when the transmitted power of the wireless charging transmitter falls into the first charging power range; and
    determine the first parameter value and the second parameter value corresponding to the first charging current according to the first transmitted power and the first theoretical received power.

15. The wireless charging device of claim 13, wherein when executed by the processor, the computer readable instructions are operable with the processor to:
    set a plurality of current ranges for the charging current when the transmitted power of the wireless charging transmitter falls into the first charging power range, wherein for each of the plurality of current ranges, a difference between a maximum current and a minimum current which fall into the same current range is 100 mA; and
    obtain the first transmitted power and the first theoretical received power corresponding to the first charging current which falls into a first current range, wherein the first current range is any one of the plurality of current ranges.

16. The wireless charging device of claim 15, wherein when executed by the processor, the computer readable instructions are operable with the processor to:
    determine the first parameter value and the second parameter value corresponding to the first current range by fitting according to the first transmitted power and the first theoretical received power corresponding to each of a plurality of first charging currents in the first current range;
    wherein the first parameter value and the second parameter value are determined such that a difference between the first transmitted power and a reference first theoretical received power is smaller than a preset threshold, and the reference first theoretical received power is obtained according to the first parameter value, the second parameter value, and the first theoretical received power.

17. The wireless charging device of claim 13, wherein when executed by the processor, the computer readable instructions are operable with the processor to:
    obtain a first transmitted power and a first theoretical received power corresponding to a first charging voltage, when the transmitted power of the wireless charging transmitter falls into the second charging power range; and determine the first parameter value and the second parameter value corresponding to the first charging voltage according to the first transmitted power and the first theoretical received power.

18. The wireless charging device of claim 17, wherein when executed by the processor, the computer readable instructions are operable with the processor to:

set a plurality of voltage ranges for the charging voltage when the transmitted power of the wireless charging transmitter falls into the second charging power range, wherein for each of the plurality of voltage ranges, a difference between a maximum voltage and a minimum voltage which fall into the same voltage range is 1V;

obtain the first transmitted power and the first theoretical received power corresponding to the first charging voltage which falls into a first voltage range, wherein the first voltage range is any one of the plurality of voltage ranges.

19. The wireless charging device of claim 18, wherein when executed by the processor, the computer readable instructions are operable with the processor to determine the first parameter value and the second parameter value corresponding to the first voltage range by fitting according to the first transmitted power and the first theoretical received power corresponding to each of a plurality of first charging voltages in the first voltage range;

wherein the first parameter value and the second parameter value are determined such that a difference between the first transmitted power and a reference first theoretical received power is smaller than a preset threshold, and the reference first theoretical received power is obtained according to the first parameter value, the second parameter value, and the first theoretical received power.

20. A non-transitory computer readable storage medium configured to store computer programs which, when executed by a processor, are operable with the processor to:

obtain a first parameter value and a second parameter value according to:
  a charging current outputted by the wireless charging transmitter, when a transmitted power of the wireless charging transmitter falls into a first charging power range; or
  a charging voltage outputted by the wireless charging transmitter, when the transmitted power of the wireless charging transmitter falls into a second charging power range;

obtain a reference received power according to the first parameter value, the second parameter value, and the received power of the wireless charging receiver; and determine that a foreign object is located between the wireless charging transmitter and the wireless charging receiver when a difference between the transmitted power and the reference received power is greater than a preset threshold;

wherein in the first charging power range, the wireless charging transmitter outputs a constant voltage, and in the second charging power range, the wireless charging transmitter outputs a constant current.

* * * * *